(12) United States Patent
Rosinski et al.

(10) Patent No.: US 11,788,528 B2
(45) Date of Patent: *Oct. 17, 2023

(54) THERMISTOR FLOW PATH

(71) Applicant: GHSP, INC., Holland, MI (US)

(72) Inventors: Ryan David Rosinski, Whitehall, MI (US); Bradley John Vecellio, Spring Lake, MI (US)

(73) Assignee: GHSP, Inc., Holland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/893,418

(22) Filed: Aug. 23, 2022

(65) Prior Publication Data

US 2022/0403840 A1 Dec. 22, 2022

Related U.S. Application Data

(63) Continuation of application No. 17/141,265, filed on Jan. 5, 2021, now Pat. No. 11,454,235, which is a
(Continued)

(51) Int. Cl.
| | |
|---|---|
| *F04C 2/10* | (2006.01) |
| *F04C 15/00* | (2006.01) |
| *F04D 29/58* | (2006.01) |
| *F04C 29/04* | (2006.01) |
| *F04D 13/06* | (2006.01) |

(52) U.S. Cl.
CPC .......... *F04C 2/102* (2013.01); *F04C 15/0096* (2013.01); *F04C 29/045* (2013.01); *F04C 29/047* (2013.01); *F04D 13/0646* (2013.01); *F04D 13/0653* (2013.01); *F04D 29/58* (2013.01); *F04D 29/5806* (2013.01); *F04D 29/588* (2013.01); *F04D 29/5813* (2013.01)

(58) Field of Classification Search
CPC ............. F04D 13/0646; F04D 13/0653; F04D 13/5806; F04D 13/5813; F04D 13/588; F04D 13/58; F04C 15/0096; F04C 29/04; F04C 29/047; F04C 29/045; F04C 2/102; F04C 29/58; F04C 29/5806; F04C 29/5813; F04C 29/588
See application file for complete search history.

(56) References Cited

U.S. PATENT DOCUMENTS 2,939,399 A * 6/1960 Rutschi .................. F04D 13/06
417/357
3,220,350 A * 11/1965 White ................. F04D 13/0613
417/357
(Continued)

OTHER PUBLICATIONS pumpschool.com, published 2014, URL: https://web.archive.org/web/20140217213654/http://www.pumpschool.com/principles/gerotor.asp).

*Primary Examiner* — Christopher S Bobish
(74) *Attorney, Agent, or Firm* — Price Heneveld LLP

(57) ABSTRACT

A fluid pump includes a pump element in communication with an inlet and an outlet. Rotation of the pump element generates a suction at the inlet and pressure at the outlet. The suction and pressure cooperate to move a fluid through a fluid path. An accessory fluid path is in communication with the inlet and outlet. The accessory fluid path includes a thermistor in communication with the accessory fluid path. The thermistor monitors a temperature of the fluid within the accessory fluid path.

20 Claims, 4 Drawing Sheets

Related U.S. Application Data continuation of application No. 15/590,248, filed on May 9, 2017, now Pat. No. 10,914,305.

(60) Provisional application No. 62/342,615, filed on May 27, 2016.

(56) References Cited

U.S. PATENT DOCUMENTS

| | | | | |
|---|---|---|---|---|
| RE26,438 E | * | 8/1968 | White | F04D 13/0613 417/357 |
| 4,642,614 A | | 2/1987 | Cook | |
| 4,652,218 A | * | 3/1987 | Tsutsui | F04D 13/064 417/370 |
| 5,009,578 A | * | 4/1991 | Hyland | F04D 29/0416 417/370 |
| 5,044,896 A | * | 9/1991 | Genster | H02K 5/128 417/370 |
| 5,129,795 A | * | 7/1992 | Hyland | H02K 7/09 417/423.12 |
| 5,151,016 A | * | 9/1992 | Her | F04D 15/0218 417/372 |
| 5,322,421 A | * | 6/1994 | Hansen | F04C 15/0069 417/420 |
| 5,725,362 A | * | 3/1998 | Zepp | F04C 15/0096 417/366 |
| 5,882,182 A | * | 3/1999 | Kato | H02K 9/197 417/366 |
| 5,939,813 A | * | 8/1999 | Schob | F04D 29/041 310/90 |
| 5,949,171 A | * | 9/1999 | Horski | F04D 13/064 310/43 |
| 5,997,261 A | * | 12/1999 | Kershaw | F04D 29/5813 417/357 |
| 5,997,264 A | * | 12/1999 | Klein | F04D 29/061 418/176 |
| 6,111,334 A | * | 8/2000 | Horski | H02K 1/02 310/216.057 |
| 6,174,143 B1 | * | 1/2001 | Horski | H02K 9/19 417/366 |
| 6,447,269 B1 | * | 9/2002 | Rexroth | F04D 29/588 417/370 |
| 6,814,549 B2 | * | 11/2004 | Kimberlin | F04C 23/008 310/90 |
| 6,837,688 B2 | * | 1/2005 | Kimberlin | F04D 13/064 417/44.1 |
| 6,847,140 B2 | * | 1/2005 | Kimberlin | F04D 13/064 310/86 |
| 6,861,777 B2 | * | 3/2005 | Kimberlin | F04C 15/0096 310/87 |
| 6,884,043 B2 | * | 4/2005 | Kimberlin | F04C 14/06 417/357 |
| 6,986,648 B2 | * | 1/2006 | Williams | F04D 29/5813 417/370 |
| 7,081,728 B2 | * | 7/2006 | Kemp | H02P 27/16 417/228 |
| 7,927,079 B2 | * | 4/2011 | Suzuki | F04C 11/008 318/400.11 |
| 8,038,423 B2 | * | 10/2011 | Nakayoshi | F04C 11/008 418/171 |
| 8,872,396 B2 | * | 10/2014 | Sakata | H02K 1/278 310/156.31 |
| 9,163,635 B2 | * | 10/2015 | Chiu | F04D 13/0606 |
| 9,273,598 B2 | | 3/2016 | An et al. | |
| 9,587,647 B2 | * | 3/2017 | Lee | F04D 13/0626 |
| 10,060,432 B2 | * | 8/2018 | Pippes | F04C 29/023 |
| 10,323,654 B2 | | 6/2019 | Zhang et al. | |
| 10,458,414 B2 | | 10/2019 | Malvasi et al. | |
| 10,914,305 B2 | | 2/2021 | Rosinski et al. | |
| 2007/0177993 A1 | | 8/2007 | Nakamichi et al. | |
| 2012/0288380 A1 | * | 11/2012 | Kaiser | F04C 15/008 417/321 |
| 2013/0259720 A1 | * | 10/2013 | Mills | F04D 29/406 417/410.1 |
| 2013/0302142 A1 | * | 11/2013 | Chiu | F04D 29/061 415/115 |
| 2014/0144412 A1 | | 5/2014 | An et al. | |
| 2014/0356200 A1 | | 12/2014 | Chan et al. | |
| 2015/0097450 A1 | | 4/2015 | Xu et al. | |
| 2016/0177962 A1 | * | 6/2016 | Laing | F04D 29/061 417/423.13 |
| 2016/0281718 A1 | * | 9/2016 | Zhang | F04D 29/588 |
| 2017/0067469 A1 | * | 3/2017 | Malvasi | F01M 1/02 |
| 2018/0320778 A1 | * | 11/2018 | Rosinski | F04C 29/047 |
| 2019/0003477 A1 | * | 1/2019 | Graves | F04B 17/03 |
| 2021/0123436 A1 | | 4/2021 | Rosinski et al. | |

\* cited by examiner

THERMISTOR FLOW PATH

CROSS-REFERENCE TO RELATED APPLICATIONS

The present application is a continuation of U.S. patent application Ser. No. 17/141,265, filed on Jan. 5, 2021, now U.S. Pat. No. 11,454,235, which is a continuation of U.S. patent application Ser. No. 15/590,248 filed May 9, 2017, now U.S. Pat. No. 10,914,305, which claims priority to and the benefit under 35 U.S.C. § 119(e) of U.S. Provisional Patent Application No. 62/342,615, filed on May 27, 2016, all of which are entitled "THERMISTOR FLOW PATH," the entire disclosures of each are hereby incorporated herein by reference.

FIELD OF THE INVENTION

The present invention generally relates to fluid pumps, and more specifically, fluid pumps with a temperature sensing mechanism.

BACKGROUND OF THE INVENTION

Fluid pumps can be included within various fluid reservoirs for moving a fluid from within the reservoir to within another portion of the mechanism. Such pumps are configured to be submerged within the reservoir.

SUMMARY OF THE INVENTION

According to one aspect of the present invention, a fluid pump includes a pump element in communication with an inlet and an outlet. Rotation of the pump element generates a suction at the inlet and pressure at the outlet. The suction and pressure cooperate to move a fluid through a fluid path. An accessory fluid path is in communication with the inlet and outlet. The accessory fluid path includes a thermistor in communication with the accessory fluid path. The thermistor monitors a temperature of the fluid within the accessory fluid path.

According to another aspect of the present invention, a fluid pump includes a pump element in communication with a fluid path. An accessory fluid path defines a portion of the fluid path. A shadow port is in communication with the pump element, wherein the pump element and the shadow port regulate a flow of a fluid between a primary flow of the fluid to an outlet. An excess flow of the fluid to the accessory fluid path, wherein operation of the pump element in conjunction with the shadow port, promotes the primary flow of the fluid toward the outlet and simultaneously promotes the excess flow of the fluid through the accessory fluid path. The excess flow of the fluid through the accessory fluid path directly engages a thermistor disposed within the accessory fluid path. The thermistor measures a fluid temperature of the excess flow of the fluid within the accessory fluid path.

According to another aspect of the present invention, a method of operating a fluid pump includes activating a pump element to draw a fluid into a fluid path. The pump element operates to direct a fluid to a position that defines a shadow port having an orifice. The fluid is divided into a primary flow of the fluid toward an outlet of the fluid path and an excess flow of the fluid through the orifice and into an accessory fluid path. The excess flow of the fluid is directed to a thermistor. A fluid temperature of the excess flow of the fluid in the accessory fluid path is measured. The excess flow of the fluid is directed toward one of an inlet and the outlet of the fluid path.

These and other aspects, objects, and features of the present invention will be understood and appreciated by those skilled in the art upon studying the following specification, claims, and appended drawings.

DETAILED DESCRIPTION OF THE PREFERRED EMBODIMENT

Figure 1:
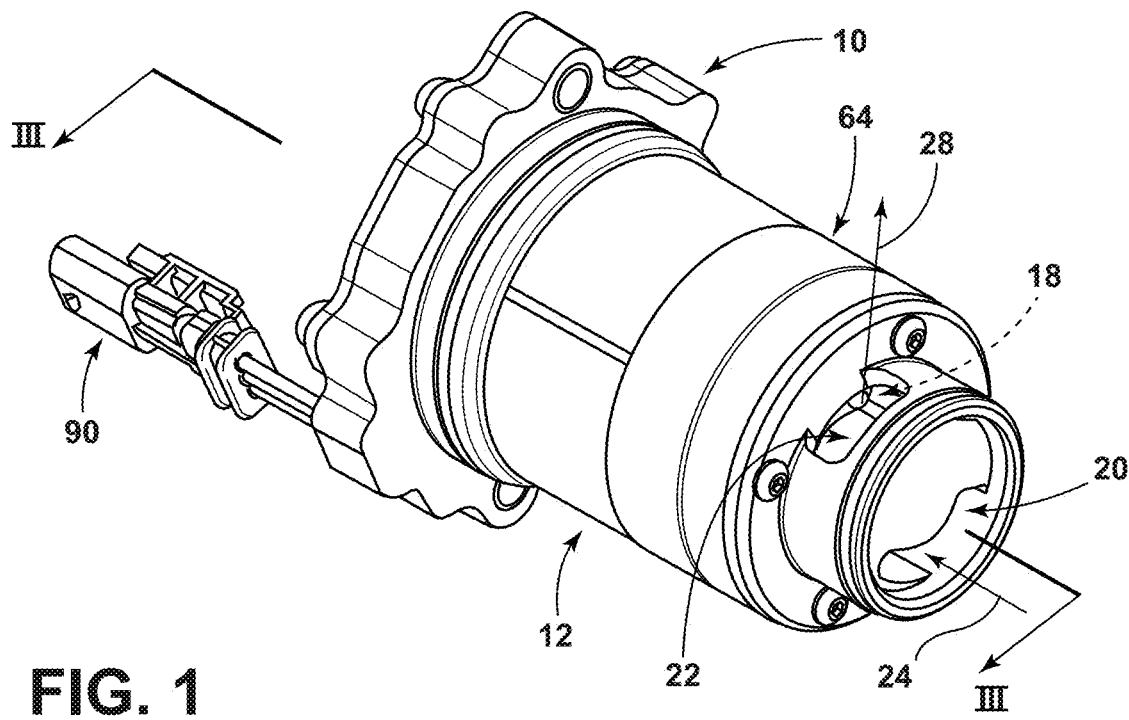
FIG. 1 is a first perspective view of a fluid pump incorporating an aspect of the thermistor fluid path.
Figure 2:
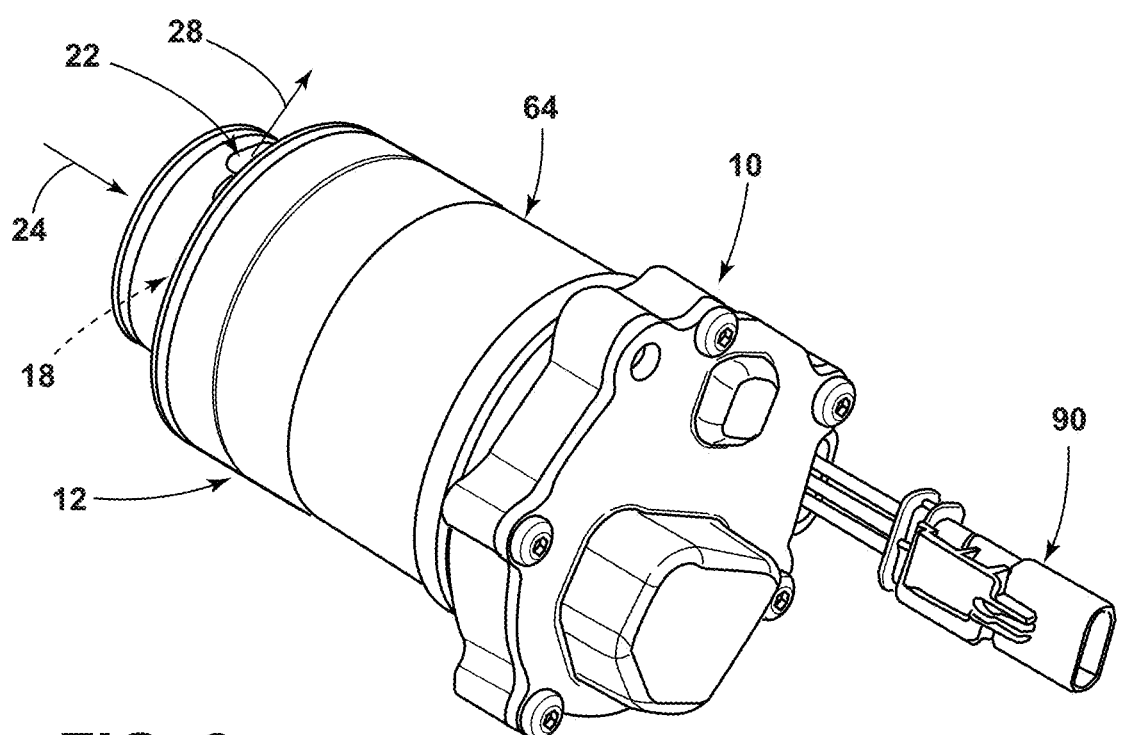
FIG. 2 is a second perspective view of the fluid pump of FIG. 1.
Figure 3:
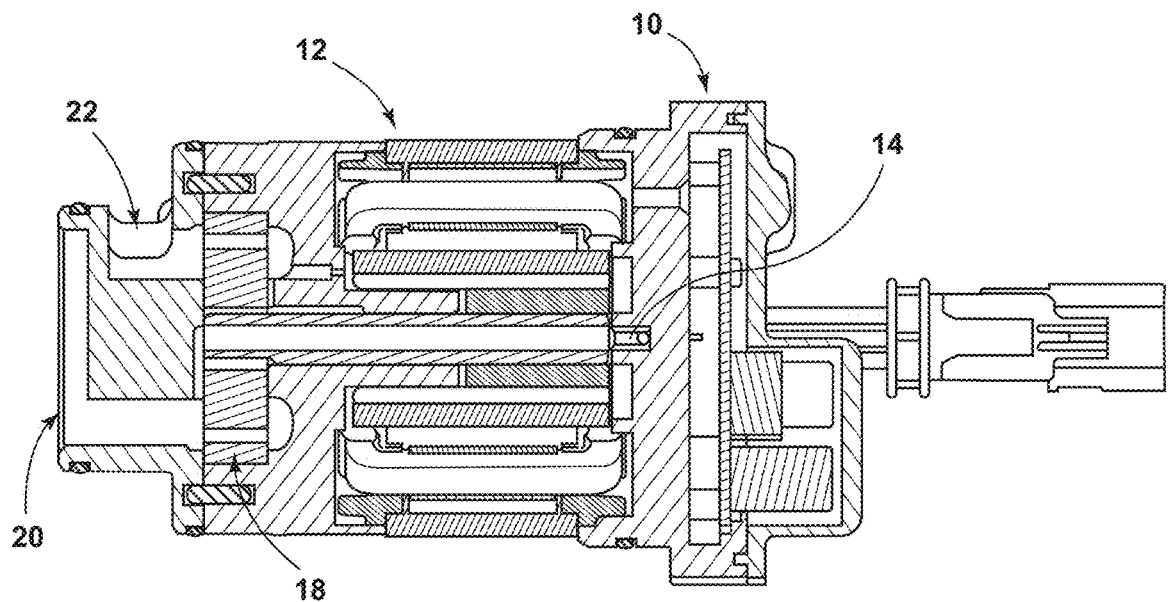
FIG. 3 is a cross-sectional view of the fluid pump of FIG. 1 taken along line III-Ill.
Figure 4:
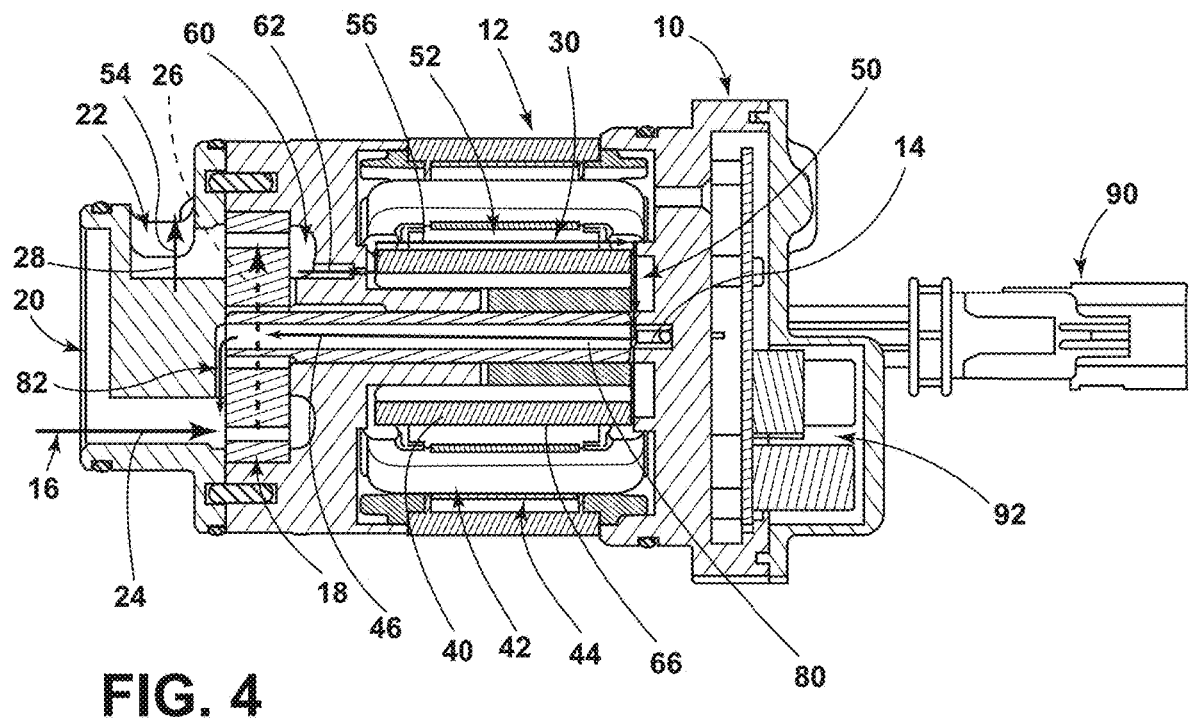
FIG. 4 is a cross-sectional view of the fluid pump of FIG. 3 illustrating a flow of a fluid through the thermistor flow path.
Figure 5:
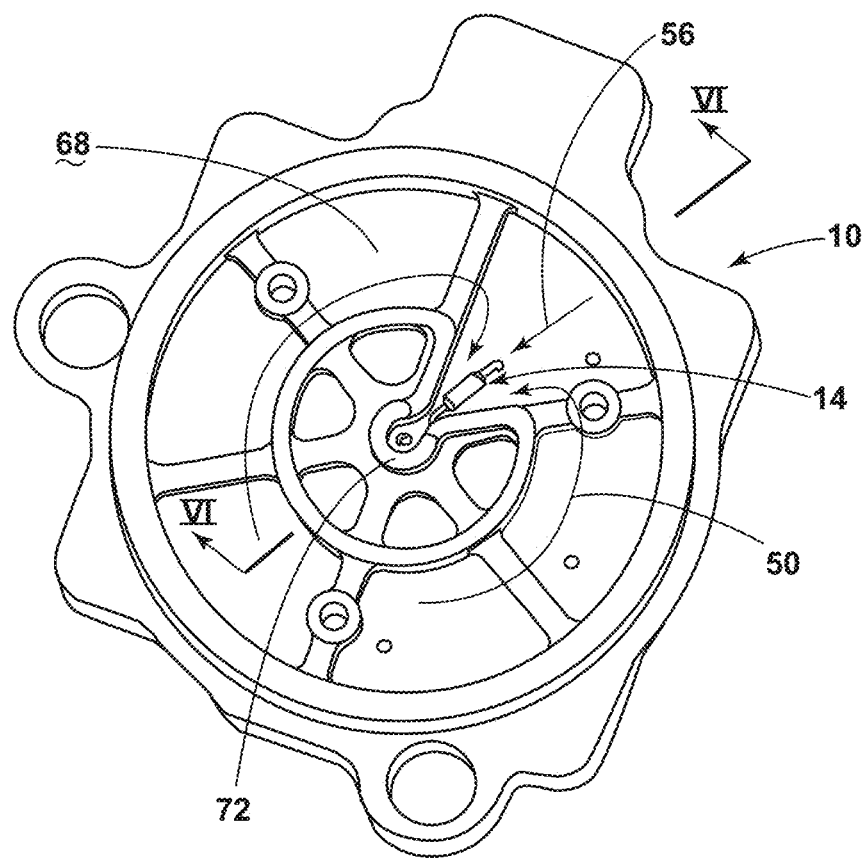
FIG. 5 is a perspective view of a printed circuit board (PCB) housing assembly for a fluid pump that incorporates an aspect of the thermistor.
Figure 6:
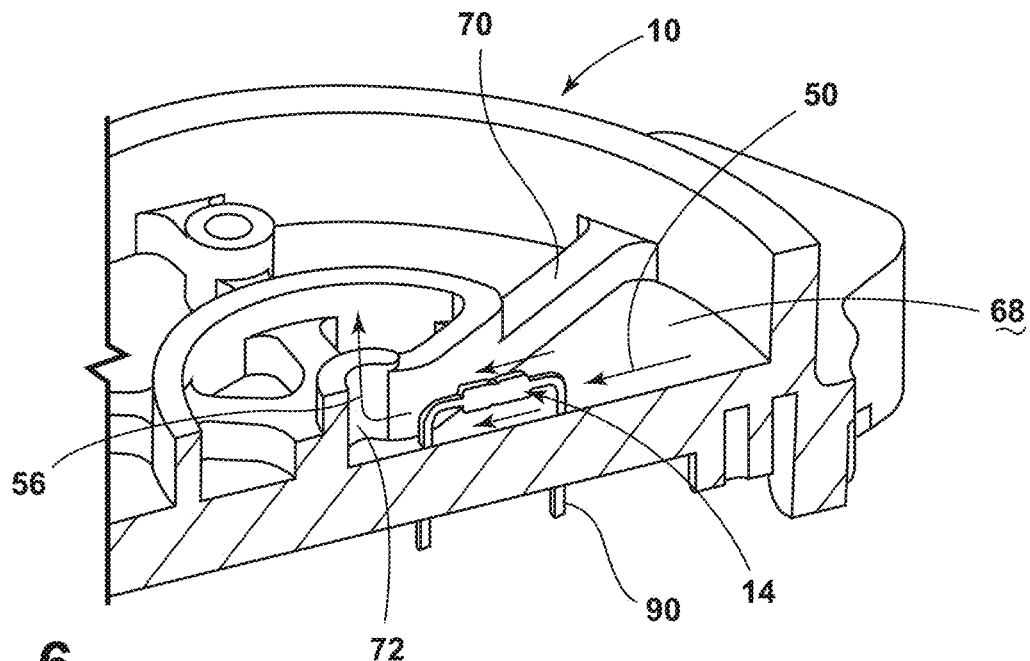
FIG. 6 is a cross-sectional perspective view of the PCB housing assembly of FIG. 5, taken along line VI-VI.
Figure 7:
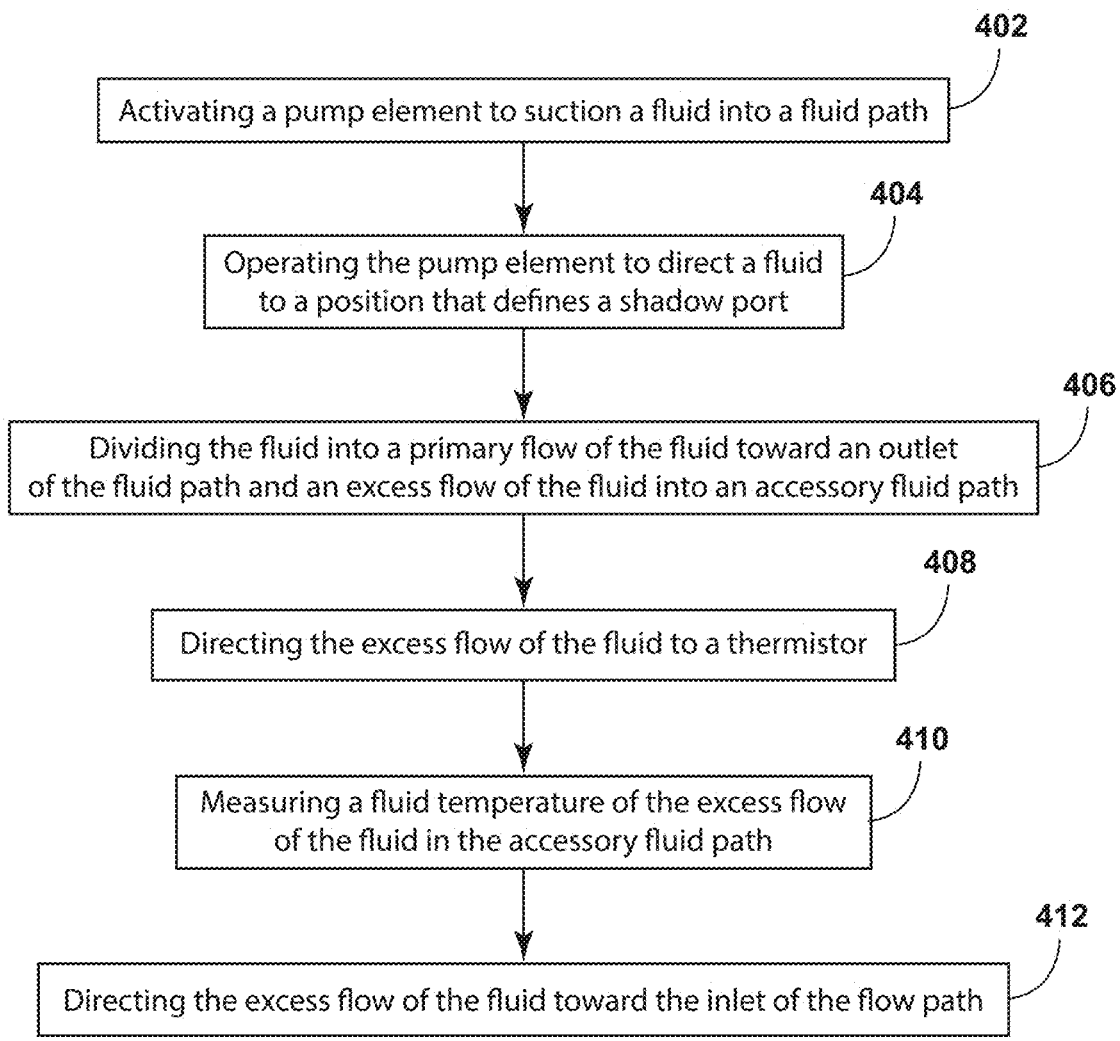
FIG. 7 is a schematic flow diagram illustrating a method for operating a fluid pump.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As shown in FIGS. 1-6, reference numeral 10 generally refers to a printed circuit board (PCB) housing assembly for a fluid pump 12 that incorporates a thermistor 14 for measuring the temperature of fluid 16 being passed through the fluid pump 12. The fluid pump 12 includes a pump element, such as a generated rotor or gerotor 18, or other similar positive displacement pump, in communication with an inlet 20 and an outlet 22 of the fluid pump 12. Activating rotation of the gerotor 18 generates a suction 24, or inward pressure, at the inlet 20 that draws fluid 16 into the fluid path 26 and outward pressure 28 at the outlet 22 that pushes fluid 16 out of the fluid path 26. The suction 24 and outward pressure 28 generated through operation of the gerotor 18 cooperate to move the fluid 16 through the fluid path 26. An accessory fluid path 30, which defines a portion of the fluid path 26, is disposed in communication with the inlet 20 and outlet 22. The accessory fluid path 30 includes the thermistor 14 that is placed in communication with fluid 16 flowing through the accessory fluid path 30. The thermistor 14 is adapted to monitor a temperature of the fluid 16 moving through the accessory fluid path 30 of the fluid pump 12.

Referring again to FIGS. 1-6, a fluid pump 12, such as an electric oil pump, generally provides lubrication and cooling to various mechanisms, such as a gear box, differential unit, or other similar mechanism. The fluid pump 12, typically in the form of a gerotor 18, brushless DC (BLDC) electric motor, and a controller can be fully integrated into a housing assembly that manages the sealing, thermal transfer and part assembly for the electric fluid pump 12. The fluid pump 12 can include a rotor 40 and stator 42 that make up the motor 44 for the fluid pump 12. A drive shaft 46 is driven by rotation of the rotor 40 and serves to rotate the gerotor 18 for generating the suction 24 and outward pressure 28 for moving fluid 16 through the fluid path 26 and, in turn, the accessory fluid path 30.

Referring again to FIGS. 1-6, the accessory fluid path 30, in the form of a thermistor flow path 50, serves to provide a fluid pump 12 with a temperature sensing functionality for providing real time measurements regarding fluid temperature during operation of the fluid pump 12. The temperature sensor can be a thermistor-style leaded component that is installed in the same cavity as the rotor assembly 52 that serves to drive the gerotor 18. Typically, this cavity is "wet" as the rotor 40 is submerged in fluid 16, such as oil. Within the fluid pump 12, the fluid 16 moving through the gerotor 18 flows through an outlet shadow port 60 having an orifice 62 that helps to regulate and divide the flow of fluid 16 through the fluid path 30 of the fluid pump 12, as will be described more fully below.

The fluid 16 is divided between a regulated primary flow 54 of the fluid 16 and the remaining fluid 16 that defines an excess flow 56 of the fluid 16. In regulating the flow of fluid 16 from the outlet shadow port 60 and orifice 62, the primary flow 54 is a predetermined amount of the fluid 16 that is directed to the outlet 22. By dividing the fluid 16, the excess flow 56 of fluid 16 that is not part of the regulated primary flow 54 of the fluid 16 is directed through the orifice 62 and into the accessory fluid path 30. In this manner, the gerotor 18 pushes the primary flow 54 of the fluid 16 through the outlet 22 and simultaneously pushes the excess flow 56 of the fluid 16 through the orifice 62 and into the accessory fluid path 30. Directing the movement of the excess flow 56 of fluid 16 helps to ensure that there is a continuous or substantially continuous flow of fluid 16 across the thermistor 14. Additionally, this configuration of the accessory fluid path 30 in relation to the outlet shadow port 60 and orifice 62 also helps to ensure that the temperature of the excess flow 56 of the fluid 16 is at least substantially similar to the primary flow 54 of fluid 16 that is directed through the outlet 22. This configuration helps to provide real time or substantially real time temperature measurements of the fluid 16.

In this disclosed device, the accessory fluid path 30 is placed in communication with the outlet shadow port 60 through the orifice 62 that controls the excess flow 56 of the fluid 16 from the outlet shadow port 60 and into the accessory fluid path 30. From the orifice 62 at the outlet shadow port 60, the excess flow 56 of fluid 16 flows around at least a portion of the rotor assembly 52, but within the housing 64 of the fluid pump 12. After passing along the side 66 of the rotor assembly 52, the excess flow 56 of fluid 16 is directed along an inner surface 68 of the PCB housing assembly 10 where the thermistor 14 is located. The inner surface 68 of the PCB housing assembly 10 includes contours 70 that are configured to direct the excess flow 56 of fluid 16 from the sides 66 of the rotor assembly 52 along the contours 70, into engagement with the thermistor 14, and to a central portion 72 of the PCB housing assembly 10. In this manner, the contours 70 and central portion 72 of the inner surface 68 of the PCB housing assembly 10 at least partially defines the thermistor flow path 50 and the accessory fluid path 30. The central portion 72 of the PCB housing assembly 10 is in communication with a channel 80 of the drive shaft 46. This channel 80 of the drive shaft 46 extends through the center of the drive shaft 46 and the rotor assembly 52 and up through the gerotor 18 and to a recirculation path 82 that recombines the excess flow 56 of the fluid 16 with fluid 16 entering the inlet 20. In this manner, the excess flow 56 of the fluid 16 is draw back into the inlet 20 by the suction 24 generated by the gerotor 18. The recombined fluid 16 is then delivered via the gerotor 18 and is divided into the primary and excess flows 54, 56 of fluid 16 as described above. In this configuration, a portion of the excess flow 56 upon leaving the recirculation path 82 may be divided again as part of the excess flow 56. It is contemplated that the excess flow 56 from the recirculation path 82 will be sufficiently mixed with the fluid 16 entering the inlet 20. Accordingly, the amount of the excess flow 56 that is divided again into a portion of the excess flow 56 is substantially minimal. The effects of a portion of the excess flow 56 being directly recirculated again through the accessory fluid path 30 as part of the excess flow 56 will have minimal effects on the temperature measurements of the thermistor 14.

In various embodiments, the recirculation path 82 may direct the excess flow 56 of fluid 16 from the accessory fluid path 30 to the outlet 22 of the fluid pump 12. In this manner, the excess flow 56 can be at least partially re-combined with the primary flow 54 of fluid 16 that is moved through the outlet 22.

Referring again to FIGS. 1-6, the return path of the fluid 16 within the accessory fluid path 30 and through the central channel 80 of the drive shaft 46 forces the excess flow 56 of the fluid 16 to flow directly over the thermistor 14. Accordingly, temperature measurements of the excess flow 56 of the fluid 16 moving through the thermistor flow path 50 can be taken by the thermistor 14 in real time or substantially in real time. The amount of fluid 16 moving through the accessory fluid path 30 is controlled by the size of the orifice 62 on the high pressure side of the fluid path 26. Additionally, the return path of the accessory fluid path 30 is at a lower restriction to prevent a pressure build-up within the motor cavity. In order to deliver the signal from the thermistor 14 within the PCB housing assembly 10, terminals 90 are used to connect the thermistor 14 to the PCB housing assembly 10. These terminals 90 are sealed to prevent leaking into the PCB cavity 92 on the opposite side 66 of the thermistor 14.

Within conventional fluid pumps 12, very little fluid 16 is moved in and around the motor cavity. As such, placing a thermostat or other temperature sensing device within this area provides little, if any, temperature-related information.

Referring again to FIGS. 1-6, the accessory fluid path 30 that provides the thermistor flow path 50 provides a convenient and accurate mechanism for measuring the temperature of the fluid 16 flowing through the fluid pump 12 while not diminishing the performance of the fluid pump 12.

It is contemplated that the fluid pump 12 described herein can be used in various applications that can include, but are not limited to, fuel pumps, oil pumps, water pumps, combinations thereof, and other fluid pumps 12 that may be submerged or non-submerged.

It is contemplated that the PCB housing assembly 10 and terminals 90 can be incorporated within new pumps or can be manufactured for installation with after-market pumps.

Having described various aspects of the device, a method 400 is disclosed for operating the fluid pump 12. This method 400 includes step 402 of activating a pump element to draw a fluid 16 into a fluid path 26. The pump element operates to direct a fluid 16 to a position that defines a shadow port 60 (step 404). The fluid 16 is divided into a primary flow 54 of the fluid 16 toward an outlet 22 of the fluid path 26 and an excess flow 56 of the fluid 16 through an orifice of the shadow port 60 and into an accessory fluid path 30 (step 406). The excess flow 56 of the fluid 16 is directed to a thermistor 14 (step 408). A fluid temperature of the excess flow 56 of the fluid 16 in the accessory fluid path 30 is measured (step 410). The excess flow 56 of the fluid 16 is directed toward the inlet 20 of the fluid path 26 (step 412).

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A fluid pump comprising:
   a pump element disposed within a housing, wherein rotation of the pump element generates an inward suction proximate an inlet of the housing and outward pressure proximate an outlet of the housing to move fluid through a fluid path;
   a motor that drives the pump element, wherein the motor includes a stator and a rotor disposed within the housing;
   an accessory fluid path in communication with the fluid path, wherein an orifice proximate the inlet directs an excess portion of the fluid from the fluid path and into the accessory fluid path that includes a low-restriction return path that generates a continuous flow of the fluid through the accessory fluid path during operation of the pump element; and
   a circuit board housing that defines a portion of the accessory fluid path, the circuit board housing having a printed circuit board with a thermistor in communication with the accessory fluid path, wherein:
      the low-restriction return path is configured to maintain a temperature of the continuous flow of the fluid in the accessory fluid path to be similar to a temperature of the fluid in the fluid path; and
      the thermistor is positioned in communication with a contoured portion of the circuit board housing to simultaneously monitor, in real time, the temperature of the continuous flow of the fluid in the accessory fluid path and the temperature of the fluid in the fluid path.

2. The fluid pump of claim 1, wherein the operation of the pump element moves the fluid through a plurality of flow paths.

3. The fluid pump of claim 2, wherein the plurality of flow paths include the fluid path and the accessory fluid path.

4. The fluid pump of claim 2, wherein the plurality of flow paths each move the fluid to the outlet.

5. The fluid pump of claim 1, wherein the thermistor is disposed within the accessory fluid path.

6. The fluid pump of claim 1, wherein the orifice is positioned proximate the pump element, and wherein the orifice regulates the continuous flow of the fluid into the fluid path and regulates the continuous flow of the excess portion of the fluid into the accessory fluid path.

7. The fluid pump of claim 1, wherein the accessory fluid path extends through a central channel of a drive shaft of the pump element.

8. The fluid pump of claim 7, wherein the central channel of the drive shaft extends through the pump element.

9. The fluid pump of claim 6, wherein the pump element includes a regulating portion of the orifice that regulates the continuous flow of the fluid toward the outlet and toward the accessory fluid path.

10. The fluid pump of claim 9, wherein the regulating portion of the orifice is positioned proximate the outlet.

11. A fluid pump comprising:
    a pump element in communication with a fluid path, the pump element including a rotor and a stator within a housing;
    an orifice in communication with the pump element that cooperatively generate a primary flow of a fluid that is directed to an outlet and an excess flow of the fluid that is directed through an accessory fluid path, wherein a portion of the accessory fluid path directs the excess flow of the fluid between the rotor and a portion of an outer wall of the housing;
    a circuit board housing having a contoured portion, wherein the contoured portion aligns with the portion of the outer wall to define a section of the accessory fluid path; and
    a thermistor that is positioned in communication with the contoured portion; wherein
       the accessory fluid path includes a low-restriction return path that moves the excess flow of the fluid as a continuous flow through the accessory fluid path and toward one of an inlet of the housing and the outlet;
       the low-restriction return path is configured to maintain a temperature of the excess flow of the fluid within the contoured portion of the accessory fluid path to be similar to a temperature of the primary flow of the fluid; and
       the thermistor simultaneously monitors, in real time, the temperature of the excess flow of the fluid in the accessory fluid path and the temperature of the primary flow of the fluid in the fluid path.

12. The fluid pump of claim 11, wherein the low-restriction return path directs the excess flow of the fluid from the accessory fluid path to the outlet.

13. The fluid pump of claim 11, wherein operation of the pump element moves the fluid through a plurality of flow paths.

14. The fluid pump of claim 13, wherein the plurality of flow paths include the fluid path and the accessory fluid path.

15. The fluid pump of claim 13, wherein the plurality of flow paths each move the fluid to the outlet.

16. The fluid pump of claim 11, wherein the thermistor is disposed within the accessory fluid path.

17. The fluid pump of claim 11, wherein the orifice is positioned proximate the pump element, and wherein the orifice regulates the continuous flow of the fluid into the fluid path and regulates the continuous flow of the excess flow of the fluid into the accessory fluid path.

18. The fluid pump of claim 11, wherein the accessory fluid path extends through a central channel of a drive shaft of the pump element, and wherein the central channel of the drive shaft extends through the pump element.

19. The fluid pump of claim 17, wherein the pump element includes a regulating portion of the orifice that regulates the continuous flow of the fluid toward the outlet and toward the accessory fluid path.

20. The fluid pump of claim 19, wherein the regulating portion of the orifice is positioned proximate the outlet.

\* \* \* \* \*